United States Patent
Gurney

(10) Patent No.: US 8,955,544 B2
(45) Date of Patent: Feb. 17, 2015

(54) GREASE COUPLER

(75) Inventor: Richard Stillard Gurney, Kwa Zulu Natal (ZA)

(73) Assignee: Gurtech (Pty) Ltd., Kwazulu Natal (ZA)

(*) Notice: Subject to any disclaimer, the term of this patent is extended or adjusted under 35 U.S.C. 154(b) by 156 days.

(21) Appl. No.: 13/513,238

(22) PCT Filed: Dec. 1, 2009

(86) PCT No.: PCT/ZA2009/000106
§ 371 (c)(1),
(2), (4) Date: Jul. 5, 2012

(87) PCT Pub. No.: WO2011/069172
PCT Pub. Date: Jun. 9, 2011

(65) Prior Publication Data
US 2012/0267890 A1  Oct. 25, 2012

(51) Int. Cl.
*F16K 15/00* (2006.01)
*F16K 21/04* (2006.01)
*F16L 21/06* (2006.01)
*B65D 25/40* (2006.01)
*F01M 11/04* (2006.01)
*F16N 21/00* (2006.01)
*F16L 37/138* (2006.01)
*F16N 3/12* (2006.01)
*F16N 21/02* (2006.01)

(52) U.S. Cl.
CPC ............ *F16L 37/138* (2013.01); *F16N 3/12* (2013.01); *F16N 21/02* (2013.01)
USPC ........... 137/539; 285/316; 285/322; 222/571; 184/105.1

(58) Field of Classification Search
CPC ..... F16L 33/225; F16L 37/0982; F16L 37/22; F16L 37/0841; F16L 37/138; F16K 35/025; F16K 31/445; F16K 31/602; F16K 23/00
USPC ............ 137/512.3, 539, 539.5; 285/322, 316, 285/324; 251/153, 155, 156; 141/115, 116, 141/117; 222/571, 252, 256–258; 239/569, 239/570, 581.2; 184/105.1, 105.2, 105.3
See application file for complete search history.

(56) References Cited

U.S. PATENT DOCUMENTS 1,483,268 A   2/1924   Baldauf
1,703,286 A * 2/1929   Zerk .......................... 222/321.6
(Continued)

FOREIGN PATENT DOCUMENTS

GB   200 381 A   7/1923
GB   689 027 A   3/1953

OTHER PUBLICATIONS

International Search Report, dated Aug. 5, 2010, from corresponding PCT application.

*Primary Examiner* — John Rivell
*Assistant Examiner* — Michael R Reid
(74) *Attorney, Agent, or Firm* — Young & Thompson

(57) ABSTRACT

An improved grease coupler 3 allows for positive, coupling and uncoupling from a grease nipple 4 via a manually operated trigger mechanism 30. The coupler includes a replaceable seal 13 and has an elongate body 10 with a grease passage 11 through the length of the body. A floating barrel plunger 42 acts as a check valve to prevent grease leaking from the discharge end of the elongate body 10 upon disconnection.

16 Claims, 3 Drawing Sheets

Sectional Side View          Front View

(56) References Cited

U.S. PATENT DOCUMENTS

| | | | | |
|---|---|---|---|---|
| 1,931,122 A | * | 10/1933 | Zerk | 141/311 R |
| 2,675,829 A | * | 4/1954 | Livers | 137/614.06 |
| 2,784,987 A | * | 3/1957 | Corcoran | 285/82 |
| 3,779,586 A | * | 12/1973 | Rossiter | 285/308 |
| 4,195,812 A | | 4/1980 | Norcross | |
| 2003/0025326 A1 | * | 2/2003 | Schulte | 285/316 |

* cited by examiner

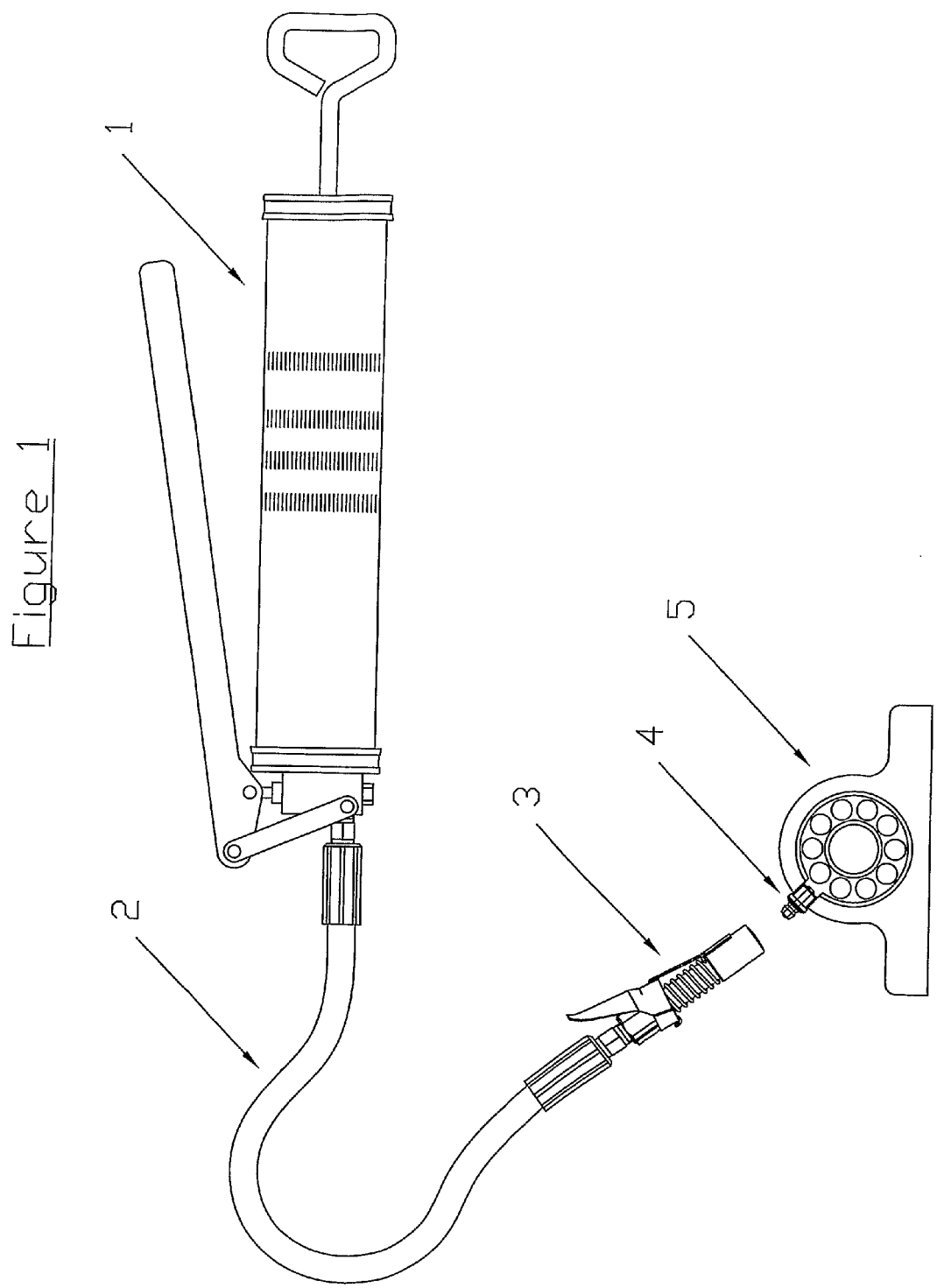

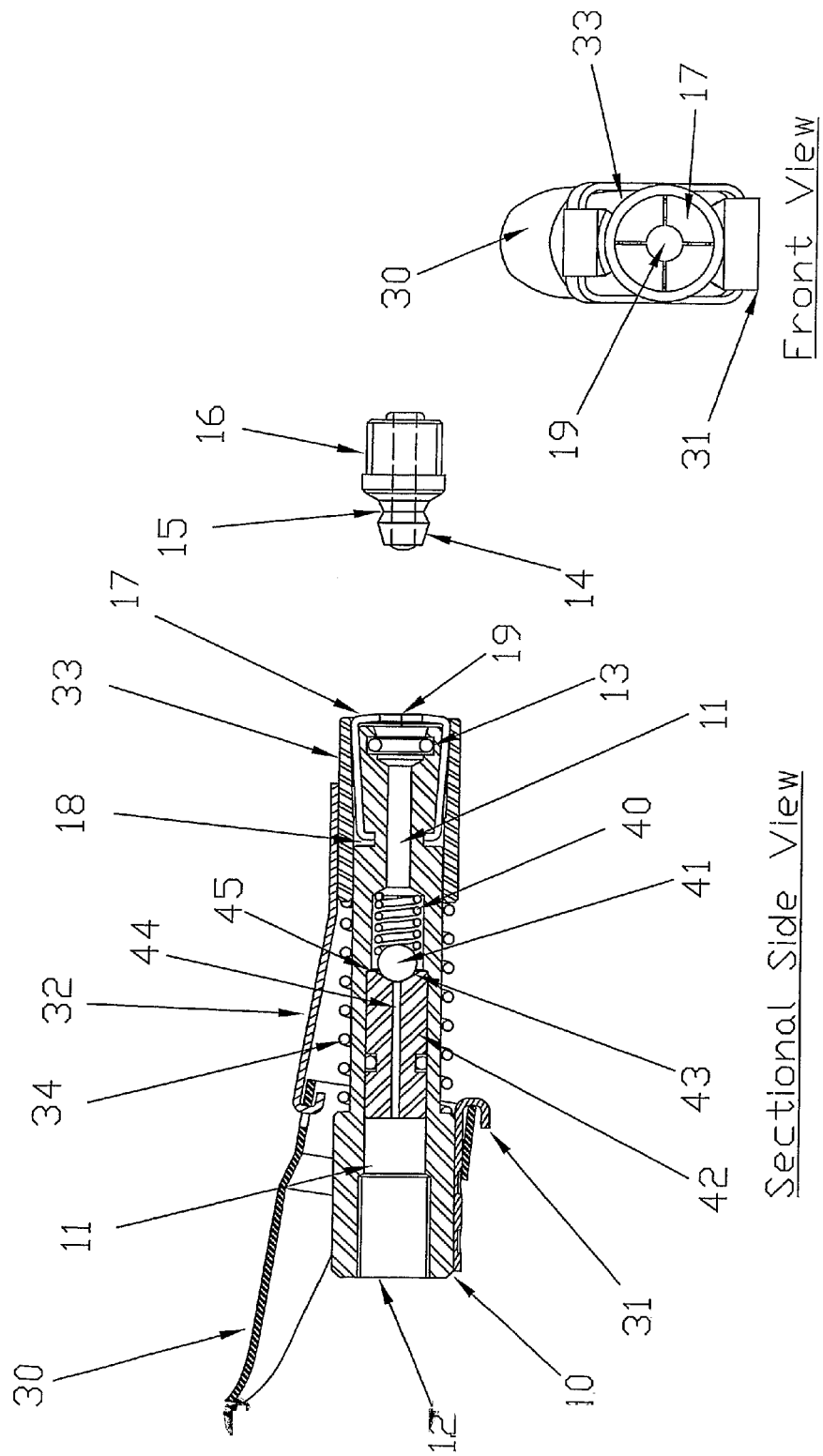

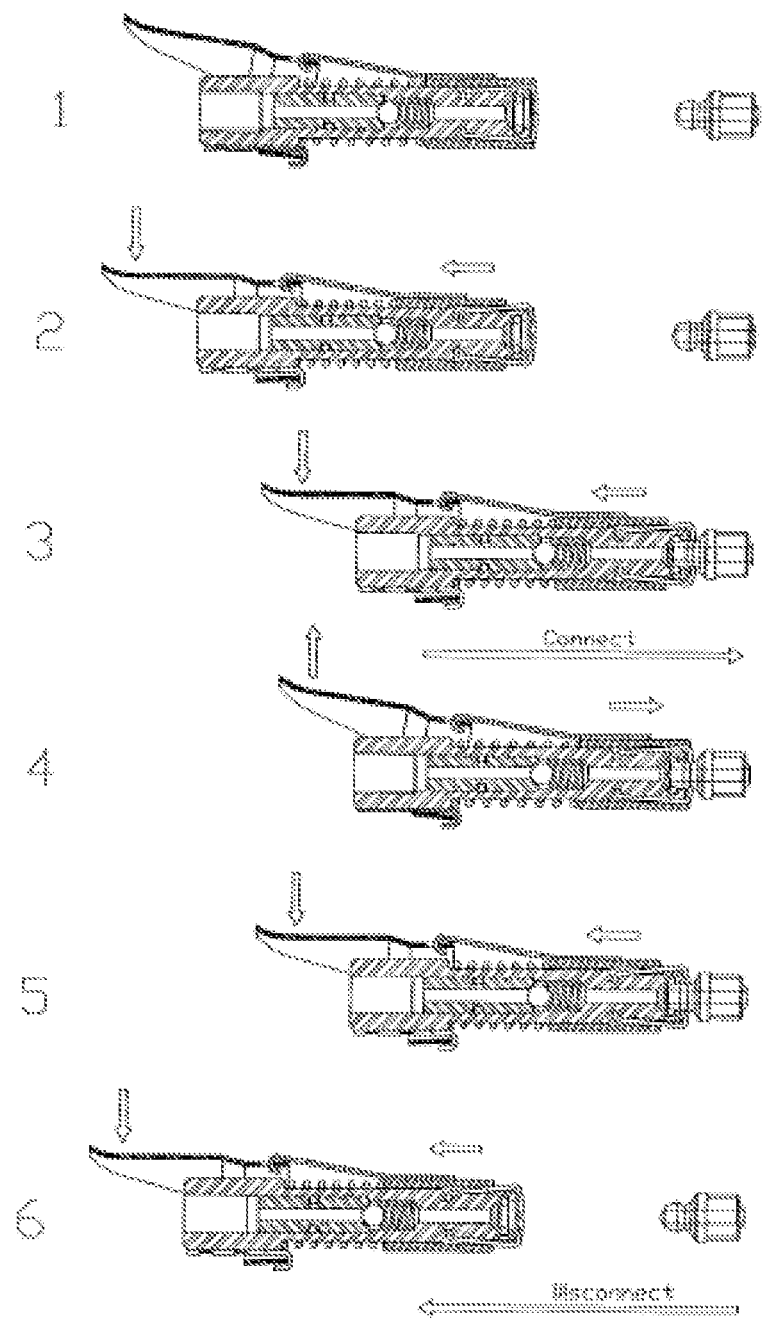

GREASE COUPLER

TECHNICAL FIELD OF THE INVENTION

This invention relates to an improved apparatus for connecting the pressurized discharge from a grease gun to a standard Zerk type grease nipple.

BACKGROUND ART

The conventional Zerk coupler and Zerk nipple have remained virtually unchanged for well over 50 years. There are other types of couplers and nipples available on the market; however the Zerk type has become close to being the international standard.

When connecting the standard Zerk coupler to a matching nipple, the coupler is pushed against the nipple, this force displacing the retaining jaws backwards against a spring tension into a conical cavity which allows the jaws to expand over the head of the nipple. On releasing this manual force the internal spring drives the jaws forward into the tapered chamber thereby clipping the jaws over the nipple head. The angles of the taper are of such a degree that the coupler can be easily pulled off the nipple at this stage. To prevent this from happening as the grease pressure builds up, the coupler incorporates a method of exploiting the pressure in the delivery line to firmly clamp the coupler to the nipple. The higher the pressure in the delivery line, the firmer the clamping.

The negative to this scenario is that when there remains a positive pressure within the delivery line at the end of the greasing cycle it becomes very difficult to disengage the coupler from the nipple. In early versions of the Zerk coupler there was a metal to metal contact between the coupler and the nipple which was prone to by-pass and thereby relieving the pressure after greasing to allow for easy disconnection. The majority of the modern versions make use of a permanent internal seal which is a positive for reducing bypass during greasing, however has a distinct negative effect when it comes to disconnecting under pressure. In such a case the operator will need to either unscrew the coupler or agitate it vigorously relative to the nipple to encourage a bypass and allow for disconnection. In the course of such action the coupler and the nipple often become damaged and result in relatively short service life.

In searching for a more appropriate alternative the applicant has developed a grease coupler with an effective economical and easily replaceable seal and a manually operated trigger device that can be used to disconnect the grease coupler from the grease nipple even under high pressure with no twisting or manipulation. It is a requirement that the improved coupler is of a compact design to allow for access to nipples in awkward positions. Trials have shown that operator frustration is greatly reduced due to the ease of coupling and uncoupling with the nipple thereby increasing the service life of both the coupler and the nipple and in turn leads to more thorough greasing. The replaceable seal also ensures that an effective seal between the grease coupler and the nipple is achieved at all times thereby reducing waste grease at the nipple during greasing.

SUMMARY OF THE INVENTION

According to the invention, an improved grease coupler comprises an elongate body defining a passage through the full length thereof; the rear end of the body including a threaded inlet port and the front (discharge) section of the body including clamping means for engaging a grease nipple, the clamping means being manually activable to engage and disengage the nipple.

In the preferred form of the invention the clamping means permits engagement and disengagement of the nipple in both pressurized and non-pressurized situations.

Also in the preferred form of the invention, the clamping means comprises a plurality of clamping elements radially located about the front end of the elongate body and defining an aperture for receipt of the head of a grease nipple, the size of the aperture being variable manually by the movement of a sleeve member along the body of the elongate member, the sleeve member being movable from a first position in which the clamping elements are compressed to minimise the size of the aperture, and a second (open) position in which the size of the aperture is sufficient to permit receipt of the nipple. The sleeve member is preferably slidable along the body of the coupler and is preferably internally tapered to provide a front portion having a greater internal diameter than the rear portion thereof, the front portion thereof being located nearest the (front) discharge end of the elongate body.

The sleeve member is preferably biased towards the discharge end of the body for retaining the nipple within the clamping means until disengagement is effected by displacing the sleeve member in the opposite direction against a biasing means. Biasing means in the form of a coiled spring is provided for this purpose.

Movement of the sleeve member is effected by means of a trigger pivotally mounted on the elongate body and attached via a linkage mechanism associated with the rear end of the sleeve member. The trigger is squeezed by an operator to draw the sleeve member backwards along the body against the bias of the spring, allowing the clamping elements to become uncompressed and in so doing permit receipt of the nipple. Release of the trigger causes the inherent bias of the spring to slide the sleeve member forward over the clamping elements to positively engage the grease nipple.

The plurality of clamping elements comprise of a suitable material configured as segments of a cone with bent over ends to the front and rear, the rear bends being located in a radial retaining groove around the elongate body, the front bends extending over the discharge end of the elongate body to define an aperture for receipt of the grease nipple.

In order to attach the nozzle to a nipple, the sleeve element is displaced upstream to allow the clamping elements to hinge open (about their anchor points in the radial retaining groove) to accept the tapered head of the Zerk nipple into the matching tapered cavity in the discharge end of the elongate body. Once the nipple has been received into the complimentary shaped cavity within the elongate body, the front bends of the clamping elements are forced by the reverse motion of the sleeve to engage in the locating groove of the nipple to prevent its removal. When uncoupling is required the trigger must be manually activated to cause a reversal of this procedure for the nipple to be disengaged.

A replaceable seal is located within the front of the cavity an optimum distance behind the clamping elements to allow for a positive seal to be achieved between the grease coupler and the grease nipple.

The manually operated trigger mechanism allows for the tapered sleeve to be retracted against a spring load by a mechanical linkage. The trigger mechanism and linkage is designed such that the leverage works in the favor of the operator to allow for ease of activation even under a highly pressurized scenario.

A traditional check valve incorporates a biasing spring, a ball valve and a fixed valve seat.

The assembly of this invention comprises a spring loaded check valve which allows for a one directional flow of grease and is fitted to create a back pressure in the delivery line to minimize dribble from the nozzle on disconnection. Further, the fixed valve seat is replaced with a valve seat on a floating barrel plunger which can snugly reciprocate within the bore of the elongate body. The floating barrel plunger has a passage through its length terminating at the valve seat at the discharge end. A biasing spring acts on a ball valve which in turn reacts on the seat on the floating plunger and displaces the assembly upstream until the energy of the spring is depleted. As grease flow begins during greasing it encounters a now closed check valve and displaces the floating plunger assembly downstream until its movement is terminated by a restricted step in the bore of the grease passage. As the grease pressure rises it forces the check valve open to allow grease to flow under pressure downstream to the nipple. Once greasing is complete and the pressure drops the biasing spring acts on the ball valve which in turn reacts against its seat effectively closing the passage in the floating plunger. Any residual grease in the vicinity of the junction between the nozzle and the nipple is now effectively drawn back by the negative pressure generated as the floating plunger is displaced upstream by the biasing spring on disconnection.

Accordingly, the spring loaded check valve comprises a floating barrel plunger slidable within the elongate passage of the coupler, a ball valve, and a spring. The elongate passage comprises a threaded inlet port leading into a slightly narrower diameter inlet grease passage within which the floating barrel plunger is slidable, the inlet grease passage terminating at a shoulder defining the entrance to a spring passage which in turn includes a shoulder defining a grease outlet passage leading to the clamping means. The floating barrel plunger further includes a central, longitudinal bore effectively connecting the grease inlet port to the grease outlet passage. The barrel is provided with an 0-ring to ensure that grease does not bypass the plunger. The front end of the plunger includes an arcuate recess defining a seat for the ball valve, with the ball being biased against the valve seat by the action of the spring.

Thus, the grease passage which leads through the elongate body from the threaded inlet port to the delivery end is formed with two steps, the first of which limits the downstream travel of the floating plunger and the second supports the biasing spring which loads the ball valve against the valve seat in the floating plunger and biases the assembly upstream from its terminal downstream stop to its default position.

BRIEF DESCRIPTION OF THE DRAWINGS

FIG. 1: shows a general lubrication layout depicting the grease pump, the improved grease coupler, grease nipple and the bearing/bush that requires the grease.

FIG. 2: shows a cross-sectional view of the improved grease coupler depicting the clamping elements in the fully closed position and the tapered sleeve in the fully forward position.

FIG. 3: shows the engagement sequence of the grease coupler with the grease nipple indicating a standard operational cycle.

DETAILED DESCRIPTION OF THE PREFERRED EMBODIMENT

Referring to the drawings the apparatus for an improved grease coupler is detailed.

FIG. 1 depicts a general layout of a traditional type of greasing system with grease gun (1) delivering pressurised grease through delivery line (2) via the grease coupler (3) which engages zerk fitting (4) which is fixed to bearing/bush (5). The coupler forms a leak proof seal with zerk fitting. This layout depicts a manually operated hand grease gun with a flexible hose. There are many variants of grease dispensing units that can all utilise the common advantages of the improved coupler when connecting to a standard zerk fitting.

FIG. 2 depicts the preferred embodiment of the invention. Shown is the elongate body (10) with the passage (11) which runs through its full length and with inlet port (12) at the rear end of the body.

The easily replaceable seal (13) is situated at the discharge end of the elongate body where it seals on the outside of taper (14) of the zerk fitting (16).

There are a series of clamping elements (17) mounted radially around the discharge end of the body (10). They are formed to locate in retaining groove (18) but can nevertheless hinge within the groove. The segments of the clamping elements (17) rise in a conical formation from a smaller diameter at the rear, to a larger diameter at the delivery end of the elongate body (10). The front view of the clamping elements (17) show that their profiles define a circular aperture (19) the diameter of which when fully closed is slightly smaller than the diameter of the recess (15) behind the head of the zerk fitting. This allows the coupler to accommodate any undersized zerk fitting or any wear that may occur on the clamping elements and still guarantee a firm and aligned grip.

By depressing trigger (30) it will pivot about fixed point (31) and with the aid of linkage (32) draw sleeve (33) rearwards against the load of the biasing spring element (34). The front end of sleeve (33) has an internal conical taper to match that of the clamping elements (17). It is therefore obvious that when sleeve (33) is retracted the contact point between the inside of the sleeve and the clamping elements retreats in the upstream direction allowing the clamping elements to pivot open in a progressive manner about their anchor point in retaining groove (18). The taper (14) at the front of the zerk fitting (16) is now able to open the freely hinging clamping elements and penetrate the cavity in the discharge end of the elongate body until taper (14) of the zerk fitting is biased against the seal (13).

At this point the operator releases the trigger (30), the biasing spring (34) displaces sleeve (33) in the downstream direction, advancing the contact point between the inside conical taper of the sleeve and clamping elements, forcing them radially inwards with a progressively increasing force until they lodge firmly in recess (15) of the zerk fitting, ensuring contact with the seal and proper alignment.

Once the zerk fitting is adequately greased the operator then depresses trigger (30) drawing sleeve (33) rearwards to release the zerk fitting in the reverse manner. Due to the mechanical advantage of the lever this can be successfully executed even under high pressure.

The novel check valve comprises spring (40) ball valve (41), floating barrel plunger (42), valve seat (43) and the passage (44) through the length of the floating barrel plunger and shoulder (45) in the passage (11). The barrel plunger (42) reciprocates with a slidable tolerance within passage (11). In operation grease enters the inlet port (12) and encounters the floating barrel plunger with the ball valve (41) effectively blocking passage (44) due to the action of biasing spring (40). As the grease pressure rises during greasing the entire assembly is driven downstream until _barrel plunger (42) reaches its limit as defined by shoulder (45) (the plunger is depicted in this position in FIG. 2). As pressure rises further grease is forced through passage (44), reacts on ball valve (41) and overcomes the resistance of spring (43) thereby opening the check valve to allow grease to flow downstream to the zerk fitting.

The pressure required to force viscous grease through the restricted aperture (44) reacts on the upstream face of the barrel plunger (42) and ensures that the displaced barrel plunger remains in firm contact with shoulder (45) during the greasing operation.

Once greasing is complete and the pressure returns to atmospheric during disconnection, spring element (40) acts on ball (41) which reacts on floating barrel plunger (42) and drives the entire assembly upstream ensuring that any residual grease in the vicinity of the zerk fitting or front aperture of the coupler is drawn upstream in a positive manner for a very mess and waste free disconnection.

A feature of the design is that the coupler can be disconnected from the zerk fitting even when a high residual pressure remains after greasing. This is achieved by optimising the slope of the clamping elements in the conical formation. Too steep and the resultant pressure-generated forces acting on the geometry during greasing can force the sleeve in an upstream direction resulting in premature disconnection. Too flat and excessive trigger pressure is required for disconnection.

Depicted in FIG. 3 is a general greasing cycle illustrating the connection and disconnection sequence of the coupler from the zerk fitting.

The invention claimed is:

1. A grease coupler comprising:
an elongate body defining a passage through the full length thereof, a rear end of the body including a threaded inlet port and a front, discharge section of the body including clamping means mounted externally about the discharge end of the elongate body configured to engage the coupler to a Zerk-type grease nipple,
wherein the clamping means comprise at least three clamping elements radially located about the discharge section of the elongate body to form segments of a loosely-fitting cone in a conical formation, expanding outwards towards a front, discharge end of the coupler, front ends of the clamping elements being bent inwards to define a circular aperture for receipt of the head of the nipple, the size of the circular aperture being variable between a first, default position in which the clamping elements forming clamping segments of the cone are compressed to be configured to engage the grease nipple, and a second position in which the clamping elements are released to splay open about a retaining groove enough such that the clamping elements in the second position are configured to release the head of the nipple,
the angle of the conical formation of the clamping elements is in a range from 4 to 12 degrees,
the clamping elements are compressed or released by a sleeve member having an internal taper complementary to the conical formation of the clamping elements toward a discharge end of the sleeve member, the sleeve member being slidable over the elongate body between a first sleeve position in which the sleeve member is positioned forward around the clamping elements to permit engagement of the nipple under pressurized conditions, and a second sleeve position in which the sleeve member is withdrawn along the elongate body to an upstream position to facilitate intentional disengagement of the nipple by a user under both pressurized and non-pressurized conditions.

2. The grease coupler according to claim 1, wherein rear ends of the clamping elements are bent inwards and loosely retained in the radial retaining groove located about the elongate body, creating an anchor point about which the clamping elements can hinge inwards or outwards.

3. The grease coupler according to claim 1, wherein compression of the clamping elements enables the coupler to lock onto differing sizes of Zerk-type grease nipples, ranging from oversized to undersized nipples.

4. The grease coupler according to claim 1, wherein the sleeve member is biased towards the discharge end of the elongate body by a coiled spring, the spring being of such magnitude to firmly displace the sleeve member over the conical formation of the clamping elements to forcefully engage the clamping elements into a radial retaining groove of the Zerk-type grease nipple to achieve a rigid self-aligning hands free connection with the Zerk-type grease nipple.

5. The grease coupler according to claim 4, wherein the angle of the conical formation of the clamping elements and a matching angle of the tapered sleeve member are flat enough to prevent forces generated during greasing from driving the sleeve member upstream against the bias of the spring and resulting in unintended disconnection.

6. The grease coupler according to claim 5, wherein the matching angle of taper of the internally tapered sleeve member is in a range of from 4 to 12 degrees.

7. The grease coupler according to claim 1, wherein the angle of the conical formation of the clamping elements and a matching angle of the tapered sleeve member is steep enough to allow for manual disconnection when pressure remains in a delivery line after greasing.

8. The grease coupler according to claims 7, wherein and the matching angle of taper of the internally tapered sleeve member is in a range of from 4 to 12 degrees.

9. The grease coupler according to claim 4, wherein the clamping means is manually activatable by a trigger pivotally mounted on the elongate body and attached via a linkage mechanism associated with the rear end of the sleeve member, the linkage mechanism assisting the user in activating the clamping means by creating a mechanical advantage in favor of the user.

10. The grease coupler according to claim 9, wherein the activation of the trigger draws the sleeve member backwards over the body against the bias of the spring, allowing the clamping elements to become uncompressed and in so doing permit receipt of the nipple, subsequent release of the trigger causing the inherent bias of the spring to slide the sleeve member forward over the clamping elements to positively engage with oversized or undersized grease nipples.

11. The grease coupler according to claim 1, wherein a replaceable seal is located behind the clamping elements to allow for a positive seal to be achieved between the grease coupler and the grease nipple.

12. A grease coupler comprising:
an elongate body defining a passage through the full length thereof, the rear end of the body including a threaded inlet port and the front, discharge section of the body including clamping means mounted externally about the discharge end of the elongate body configured to engage the coupler to a Zerk-type grease nipple, the clamping means being manually activatable to engage and disengage the nipple,
wherein the clamping means is configured to retain the nipple in active engagement under pressurized situations and is configured to facilitate intentional disengagement of the nipple by a user under both pressurized and non-pressurized conditions, and
the grease coupler is configured to connect a discharge conduit of a grease gun to the Zerk-type grease nipple, wherein a spring loaded check valve is provided within the elongate body to allow a one-directional flow of grease through the grease coupler, the check valve comprising a floating barrel plunger able to reciprocate within the elongate passage of the coupler, a ball valve, and a spring.

13. The grease coupler according to claim 12, wherein the threaded inlet port leads into a slightly narrower diameter inlet grease passage within which the floating barrel plunger can reciprocate, the inlet grease passage terminating at a shoulder defining the entrance to a spring passage which in turn includes a tapered shoulder defining a grease outlet passage leading to the clamping means.

14. The grease coupler according to claim 13, wherein the floating barrel plunger includes a central, longitudinal bore effectively connecting the grease inlet passage to the grease outlet passage.

15. The grease coupler according to claim 12, wherein the front end of the plunger includes an arcuate recess defining a seat for the ball valve, with the ball being biased against the valve seat by the action of the spring.

16. A grease coupler configured to connect a discharge conduit of a grease gun to a Zerk-type grease nipple, the grease coupler comprising:

an elongate body defining a passage through the full length thereof, the rear end of the body including a threaded inlet port and the front, discharge section of the body including a clamping device mounted externally about the discharge end of the elongate body and configured to engage the coupler to the Zerk-type grease nipple, wherein the clamping device comprises at least three clamping elements radially located about the discharge section of the elongate body to form segments of a loosely-fitting cone in a conical formation, expanding outwards towards a front, discharge end of the coupler, front ends of the clamping elements being bent inwards to define a circular aperture for receipt of the head of the nipple, the size of the circular aperture being variable between a first, default position in which the clamping elements forming clamping segments of the cone are compressed to be configured to engage the grease nipple, and a second position in which the clamping elements are released to splay open about a retaining groove enough such that the clamping elements in the second position are configured to release the head of the nipple, the angle of the conical formation of the clamping elements is in a range from 4 to 12 degrees, the clamping elements are compressed or released by a sleeve member having an internal taper complementary to the conical formation of the clamping elements toward a discharge end of the sleeve member, the sleeve member being slidable over the elongate body between a first sleeve position in which the sleeve member is positioned forward around the clamping elements to permit engagement of the nipple under pressurized conditions, and a second sleeve position in which the sleeve member is withdrawn along the elongate body to an upstream position to facilitate intentional disengagement of the nipple by a user under both pressurized and non-pressurized conditions.

* * * * *